Feb. 6, 1934.   O. C. TRAVER   1,946,299
CONTROL OF ELECTRIC CIRCUITS
Filed June 28, 1933

Inventor:
Oliver C. Traver,
by Harry E. Dunham
His Attorney.

Patented Feb. 6, 1934

1,946,299

UNITED STATES PATENT OFFICE 1,946,299

CONTROL OF ELECTRIC CIRCUITS

Oliver C. Traver, Drexel Hill, Pa., assignor to General Electric Company, a corporation of New York Application June 28, 1933. Serial No. 678,037

8 Claims. (Cl. 175—294)

My invention relates to improvements in the control of electric circuits and more particularly to protective apparatus for and the protection of electric circuits in dependence on a predetermined function of two coexisting electric quantities of the circuit such as voltage and current so as to obtain a circuit controlling operation action based on a departure from said function. An object of my invention is to provide improved apparatus whereby to insure control in accordance with the desired relation between the quantities under consideration regardless of the magnitude of each quantity itself.

My invention will be better understood from the following description when considered in connection with the accompanying drawing and its scope will be pointed out in the appended claims.

Figure 1:
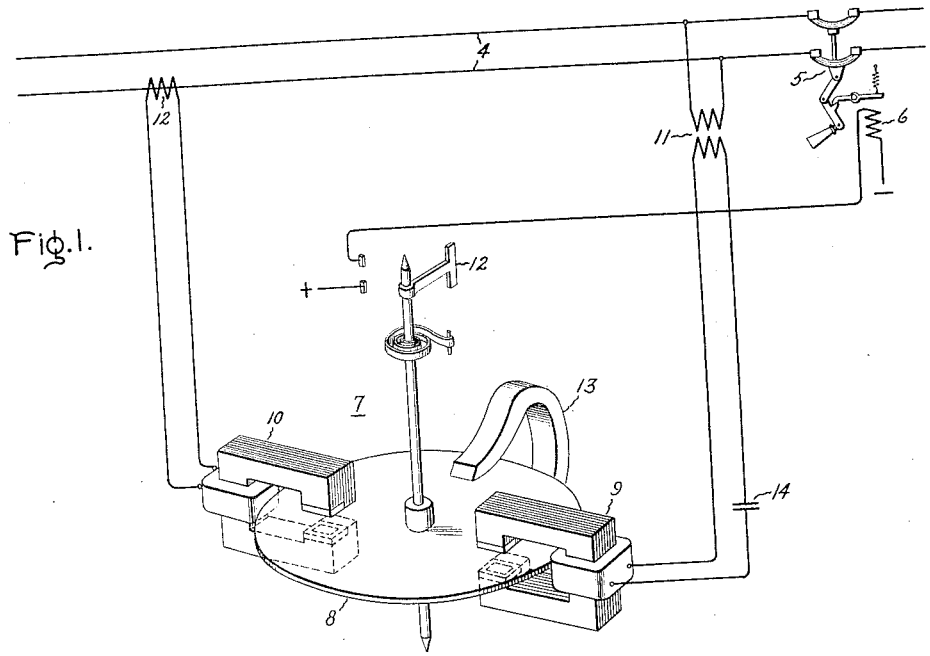
Figure 2:
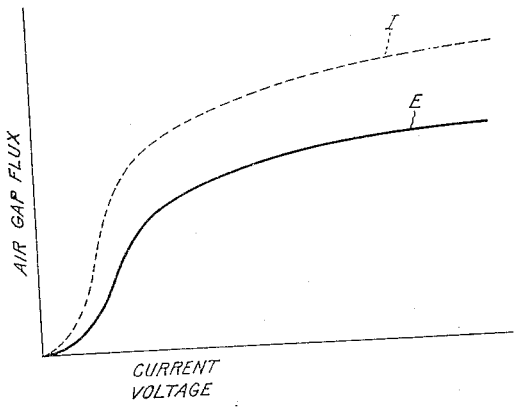
Figure 3:
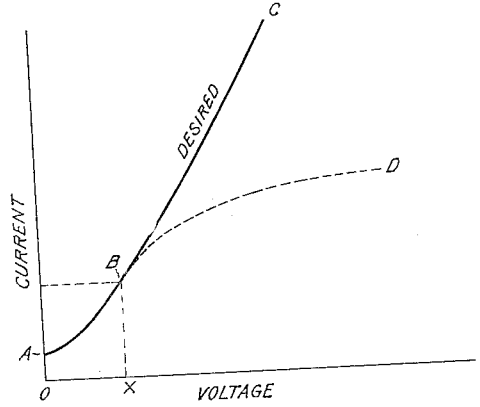

In the accompanying drawing, Fig. 1 illustrates diagrammatically a circuit protective arrangement embodying my invention and Figs. 2 and 3 are curve diagrams explanatory of my invention.

The protection of electric circuits is sometimes effected by relay devices which respond in accordance with the ratio between a current and a voltage of the circuit, that is to say the impedance of the circuit between the relay and a fault. In order, without excessive cost and bulk of apparatus, to main the desired relation under fault conditions causing low voltage, the voltage coil of the protective apparatus may be connected as disclosed in United States Letters Patent 1,895,357, issued January 24, 1933, in series with a condenser to form a circuit which is resonant up to some predetermined value of voltage so as to obtain the maximum current possible with the voltage available up to this value and yet not have excessive current or a large coil structure at normal voltage. Such a circuit is known to the art as a non-linear circuit since it has a non-linear volt-ampere characteristic. Above the selected value of voltage the magnetic structure saturates. Consequently, the desired impedance response is destroyed and the relay protective devices do not reflect the impedance relation in true form, that is to say instead of the relay device having a practically linear characteristic over its operating range, as indicated by the solid line ABC in Fig. 3, it has a characteristic as indicated by the combination of the solid line AB and the dotted line BD, the deviation of which from the desired characteristic is due to the saturation of the voltage means at some predetermined voltage OX. In accordance with my invention, I eliminate or compensate this deviation from the desired linear characteristic ABC by so constructing the current structure of the protective device as to produce the desired operation.

In Fig. 1, I have illustrated an embodiment of my invention as applied to a single phase circuit 4 for simplicity although its application to polyphase circuits will be obvious to those skilled in the art. The circuit is arranged to be controlled by any suitable circuit interrupting means 5 illustrated as a latched closed circuit breaker which has a trip coil 6.

For controlling the circuit breaker 5 in accordance with the distance between the protective apparatus and the fault, there is provided a protective device such as a differential relay 7 upon whose moving element there are exerted two opposing effects respectively dependent upon a voltage and a current of the circuit 4. As illustrated the relay may take the form of an induction relay which has a movable current conducting member, such as a rotatably mounted metallic disk 8 which is movable in the air gaps of two shaded pole electromagnetic motor elements 9 and 10. These motor elements have their windings energized respectively in accordance with a voltage and a current of the circuit 4 through potential and current transformers 11 and 12 respectively. There are thus imposed on the disk 8 two opposing torques respectively dependent on a voltage and a current of the circuit 4 so that movement of the disk and the contact controlling member 12 associated therewith is dependent on the relation between the circuit voltage and current. A drag magnet 13 may be provided for time delay action, steadying the disk movement or both.

In order to include the amplifying feature set forth in the patent mentioned, the circuit of the primary energizing winding of the voltage element may include a series connected condenser 14 to provide a resonant circuit up to some value of voltage below normal. Above this value of voltage the magnetic circuit of the voltage element is substantially saturated and resonance impaired so as to limit the current in and the heating of the voltage element. By the term substantially saturated, I intend to refer to the condition wherein an increase in ampere turns ceases to produce a proportional increase in the flux.

In accordance with my invention I so construct and arrange the magnetic circuit of the current energized motor element that this magnetic circuit is saturable relatively to the saturation of the voltage energized motor element 9 to maintain at the balance or operating point the resultant of the effects exerted by these elements substantially constant when the ratio between the voltage and the current of the circuit 4 has a predetermined value regardless of the magnitude of the voltage, that is to say whether or not the voltage exceeds the predetermined value which produces saturation and thereby the non-linear deviation BD. This may be accomplished by so constructing and arranging the magnetic circuits of both elements that they provide air gap fluxes which maintain the difference between the torques exerted by the elements 9 and 10 substantially unchanged when the ratio between the voltage and the current of the circuit 4 has a definite value for substantially all values of voltage either below or above the predetermined value. In this way it is possible to maintain the resultant torque on the disk 8 substantially constant for a given impedance of the circuit between the relay location and any point. Thus, referring to Fig. 2, the full and dotted line curves E and I respectively indicate a suitable relation between the air gap fluxes of the voltage and current elements 9 and 10 where it is desired to have a circuit controlling action when the impedance differs from a predetermined value so as to effect the opening of the circuit breaker 6.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. An electroresponsive device including a movable member, electromagnetic voltage means for exerting an effect tending to move said member in one direction having a magnetic circuit becoming substantially saturated at a predetermined voltage and electromagnetic current means for exerting an effect tending to move said member in another direction having a magnetic circuit saturable relatively to the saturation of said voltage energized means to maintain the resultant of said effects substantially constant when the ratio between the voltage and the current applied to said voltage and current energized means is substantially constant.

2. A differential relay for operation in dependence on the relative values of a coexisting voltage and current including a movable circuit controlling member and opposed electromagnetic voltage and current responsive means for controlling the movement thereof said voltage responsive means having a magnetic circuit becoming substantially saturated at a predetermined voltage and said current responsive means having a magnetic circuit saturable relatively to the saturation of said voltage responsive means to maintain the difference between the effects exerted by both of said means substantially constant as long as the ratio between the voltage applied to the one means and the current applied to the other means is substantially constant.

3. An electroresponsive device for operation in dependence on the relative values of two quantities of electric energy including a movable member, electromagnetic means energized by one of said quantities for exerting an effect tending to move said member in one direction and having a magnetic circuit becoming substantially saturated when one of said quantities exceeds a predetermined value and electromagnetic means energized by the other of said quantities for exerting an effect tending to move said member in another direction and having a magnetic circuit saturable relatively to the saturation of said first-mentioned means to maintain for all values of one of the quantities the resultant of said effects substantially constant when the ratio between said quantities has a predetermined value.

4. In combination, an alternating current circuit; a movable member and opposing electromagnetic means for controlling the movement of said member in accordance with the impedance of the circuit respectively connected to be energized in accordance with a voltage and a current of the circuit, the magnetic circuit of said voltage energized means being constructed and arranged substantially to saturate at a predetermined voltage and the magnetic circuit of said current energized means being constructed and arranged so to saturate relatively to the saturation of said voltage energized means as to maintain the relation between the effects exerted by said means substantially constant when the impedance of the circuit has a predetermined value.

5. A differential relay including voltage and current electromagnetic shaded-pole torque-producing elements and a movable current conducting member mounted in the air gaps of said elements for movement in accordance with the difference between the torques exerted thereby, the magnetic circuit of the voltage element being substantially saturated at a predetermined value of voltage and the magnetic circuits of both of said elements being constructed and arranged to provide air gap fluxes for maintaining the difference between the torques exerted by the elements substantially zero when the ratio between the voltage and the current energizing the elements has a predetermined value.

6. An electroresponsive device for operation in dependence on a predetermined function of two quantities of electric energy including electromagnetic means energized by one of said quantities and having a magnetic circuit becoming substantially saturated when one of said quantities exceeds a predetermined value and electromagnetic means energized by the other of said quantities and having a magnetic circuit saturable relatively to the saturation of said first mentioned means to maintain the resultant of the effects exerted by said means substantially constant for all values of said quantities which cause said predetermined function to have a predetermined value, and means controlled by said electromagnetic means in accordance with the resultant of the effects exerted thereby.

7. A differential relay including electro-magnetic voltage and current elements arranged to exert opposing effects, the magnetic circuit of said voltage element being substantially saturated at a predetermined value of voltage and the magnetic circuit of the current element being saturable relatively to the saturation of said voltage element to maintain a predetermined relation between the effects exerted by the two elements when the ratio between the values of the voltage and the current applied to said elements has a substantially constant value, and means controlled in accordance with the difference between the effects of said elements.

8. In combination, an alternating current circuit, means for controlling said circuit including electromagnetic means connected in a non-linear circuit to be energized in accordance with the voltage of the circuit and opposing electromagnetic means connected to be energized in accordance with the current of the circuit, the magnetic circuit of said voltage energized means being constructed and arranged substantially to saturate at a predetermined voltage and the magnetic circuit of said current energized means being constructed and arranged so to saturate relatively to the saturation of said voltage energized means as to maintain the resultant of the effects exerted by said means substantially constant for a given ratio between the voltage and the current of the circuit and for all values of the circuit voltage.

OLIVER C. TRAVER.